(12) United States Patent
Yoo et al.

(10) Patent No.: US 10,259,458 B2
(45) Date of Patent: Apr. 16, 2019

(54) PATH PLANNING APPARATUS AND METHOD FOR AUTONOMOUS VEHICLE (71) Applicant: Hyundai Motor Company, Seoul (KR)

(72) Inventors: Su Jung Yoo, Incheon (KR); Dong Hwi Lee, Gyeongi-do (KR); Hoi Won Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/239,532

(22) Filed: Aug. 17, 2016

(65) Prior Publication Data
US 2017/0320500 A1 Nov. 9, 2017

(30) Foreign Application Priority Data

May 3, 2016 (KR) ........................ 10-2016-0054595

(51) Int. Cl.
*B60W 30/18* (2012.01)
*B60W 30/095* (2012.01)
*G08G 1/16* (2006.01)

(52) U.S. Cl.
CPC .. *B60W 30/18163* (2013.01); *B60W 30/0956* (2013.01); *G08G 1/166* (2013.01); *B60W 2550/10* (2013.01); *B60W 2550/20* (2013.01)

(58) Field of Classification Search
CPC combination set(s) only.
See application file for complete search history.

(56) References Cited

U.S. PATENT DOCUMENTS

| 2010/0228419 | A1* | 9/2010 | Lee ................... B60W 30/0953 701/25 |
| 2011/0066312 | A1 | 3/2011 | Sung et al. |
| 2014/0074356 | A1 | 3/2014 | Bone et al. |
| 2015/0153735 | A1* | 6/2015 | Clarke .................. B60W 30/00 701/301 |
| 2015/0321699 | A1 | 11/2015 | Rebhan et al. |
| 2016/0144859 | A1 | 5/2016 | Yoo et al. |
| 2016/0214607 | A1* | 7/2016 | Dolgov ................. B60W 30/16 |
| 2017/0084178 | A1* | 3/2017 | Jain ........................ G08G 1/167 |

FOREIGN PATENT DOCUMENTS

| JP | 2003-025868 A | 1/2003 |
| JP | 2005-324727 A | 11/2005 |
| JP | 2010-033352 A | 2/2010 |
| JP | 2015-150979 A | 8/2015 |

(Continued)

*Primary Examiner* — Anne M Antonucci
*Assistant Examiner* — Renee LaRose
(74) *Attorney, Agent, or Firm* — Mintz Levin Cohn Ferris Glovsky and Popeo, P.C.; Peter F. Corless (57) ABSTRACT A path planning apparatus and method for an autonomous vehicle are provided. The apparatus includes a surrounding information detector that detects surrounding information around the vehicle and a vehicle information detector that detects vehicle information regarding driving states of the vehicle. A vehicle behavior determiner determines vehicle behavior based on the surrounding information and the vehicle information and a driving path generator generates a driving path and a velocity profile for a lane change using the surrounding information and the vehicle information when receiving a lane change signal from the vehicle behavior determiner.

12 Claims, 6 Drawing Sheets

(56) References Cited

FOREIGN PATENT DOCUMENTS

| | | |
|---|---:|---:|
| JP | 5763757 B2 | 8/2015 |
| JP | 2015-161966 A | 9/2015 |
| JP | 2015-215873 A | 12/2015 |
| JP | 2016-004425 A | 1/2016 |
| KR | 10-2011-0029188 A | 3/2011 |
| KR | 10-2015-0078545 A | 7/2015 |
| KR | 10-1551096 B1 | 9/2015 |
| KR | 10-1610544 B1 | 4/2016 |

* cited by examiner

PATH PLANNING APPARATUS AND METHOD FOR AUTONOMOUS VEHICLE

CROSS-REFERENCE TO RELATED APPLICATION

This application is based on and claims the benefit of priority to Korean Patent Application No. 10-2016-0054595, filed on May 3, 2016, in the Korean Intellectual Property Office, the disclosure of which is incorporated herein in its entirety by reference.

TECHNICAL YIELD

The present disclosure relates to a path planning apparatus and method for an autonomous vehicle that generate a driving path and a velocity profile for a lane change of the autonomous vehicle.

BACKGROUND

An autonomous driving system is capable of autonomous driving by recognizing surrounding circumstances and vehicle states, even without a vehicle operator's input, to reach a predetermined destination. Such an autonomous driving system performs the following operations: recognition; determination and path generation; and vehicle control. In the path generation operation, it may be necessary to generate an avoidance path in real time by detecting changes of obstacles, and generate a path to which the kinematic behavior of a vehicle has been applied.

In particular, when an autonomous vehicle attempts a lane change in a downtown area, a traffic congestion section, and an expressway where traffic changes in real time, various dangerous situations may occur, and thus, it is important to generate a safe driving path in consideration of collisions with dynamic obstacles around the vehicle. Therefore, research has continuously been conducted to generate a driving path allowing the autonomous vehicle to stably make a lane change.

SUMMARY

The present disclosure provides a path planning apparatus and method for an autonomous vehicle that generate a safe driving path and a velocity profile for a lane change of the autonomous vehicle. The safe driving path is generated by determining the degree of collision risk with respect to a dynamic obstacle around the vehicle, and the velocity profile allows the vehicle to make the lane change without a collision with the dynamic obstacle.

According to an aspect of the present disclosure, a path planning apparatus for an autonomous vehicle may include: a surrounding information detector configured to detect surrounding information around the vehicle; a vehicle information detector configured to detect vehicle information regarding driving states of the vehicle; a vehicle behavior determiner configured to determine vehicle behavior based on the surrounding information and the vehicle information; and a driving path generator configured to generate a driving path and a velocity profile for a lane change using the surrounding information and the vehicle information when receiving a lane change signal from the vehicle behavior determiner.

The surrounding information detector may be configured to detect the surrounding information using an imaging device, a distance sensor, and a position sensor. The surrounding information may include road information regarding the vehicle, and the velocity, longitudinal acceleration, lateral acceleration, and position of a dynamic obstacle around the vehicle. The vehicle information detector may further be configured to detect the velocity and position of the vehicle using a velocity sensor and a position sensor. The vehicle behavior determiner may be configured to bypass a signal generated in relation to a vehicle operator's manipulation to the driving path generator when the vehicle operator manipulates a turn signal lamp.

The driving path generator may include: a candidate path generation module configured to generate driving lane candidate paths and target lane candidate paths; a collision risk calculation module may be configured to calculate the degree of collision risk with respect to a dynamic obstacle positioned around the vehicle for each of the target lane candidate paths; a velocity profile generation module configured to generate the velocity profile using the surrounding information and the vehicle information; and a path selection module configured to select a local reference path from among the target lane candidate paths based on the degree of collision risk or both the degree of collision risk and the velocity profile.

The path selection module may be configured to select, as the local reference path, a candidate path having a lowest degree of collision risk among the target lane candidate paths. The path selection module may further be configured to select, as the local reference path, a candidate path having a minimum cost through a cost function to which the degree of collision risk and the degree of proximity to a target path have been applied. The path selection module may be configured to select, as the local reference path, a candidate path that is closest to a target lane among the driving lane candidate paths, when the lane change has failed.

According to another aspect of the present disclosure, a path planning method for an autonomous vehicle may include: receiving a lane change signal from a vehicle behavior determiner; generating driving lane candidate paths and target lane candidate paths when the lane change signal is received; calculating the degree of collision risk with respect to a dynamic obstacle positioned around the vehicle for each of the target lane candidate paths; determining whether there is a collision risk in all of the target lane candidate paths based on the calculated degree of collision risk; generating a velocity profile of the vehicle on the basis of a vehicle velocity and a target velocity when there is the collision risk in the target lane candidate paths; and selecting a local reference path from among the target lane candidate paths to which the velocity profile has been applied.

The selecting of the local reference path may include: calculating the degree of collision risk with respect to the dynamic obstacle for each of the target lane candidate paths to which the velocity profile has been applied; determining whether there is the collision risk in the target lane candidate paths to which the velocity profile has been applied; and selecting, as the local reference path, a candidate path having the lowest degree of collision risk among the target lane candidate paths to which the velocity profile has been applied, when there is no collision risk in one or more candidate paths among the target lane candidate paths to which the velocity profile has been applied.

The path planning method may further include returning to an original driving lane when there is the collision risk in the target lane candidate paths to which the velocity profile has been applied, in the determining whether there is a collision risk in the target lane candidate paths to which the velocity profile has been applied. The path planning method may further include selecting, as the local reference path, a candidate path that is closest to a target lane among the driving lane candidate paths when returning to the original driving lane.

The path planning method may further include setting a target velocity by estimating a velocity of the dynamic obstacle preventing the lane change of the vehicle and adjusting the estimated velocity of the dynamic obstacle with a predetermined velocity control rate, after returning to the original driving lane. The path planning method may further include selecting any one of the target lane candidate paths as the local reference path in consideration of the degree of collision risk with the dynamic obstacle and the degree of proximity to a target path when there is no collision risk in all of the target lane candidate paths, after calculating the degree of collision risk with respect to the dynamic obstacle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

According to exemplary embodiments of the present disclosure, when an autonomous vehicle makes a lane change in a downtown area, a driving path and a velocity profile of the autonomous vehicle may be generated by predicting a driving path of a neighboring vehicle, determining a collision risk with respect to the neighboring vehicle, and avoiding a collision with the neighboring vehicle. An autonomous vehicle may select any one of local path candidates for tracking a global path generated by a global path planner as a local reference path (LRP). In other words, the local reference path refers to a driving path of the autonomous vehicle.

Hereinafter, exemplary embodiments of the present disclosure will be described in detail with reference to the accompanying drawings.

Figure 1:
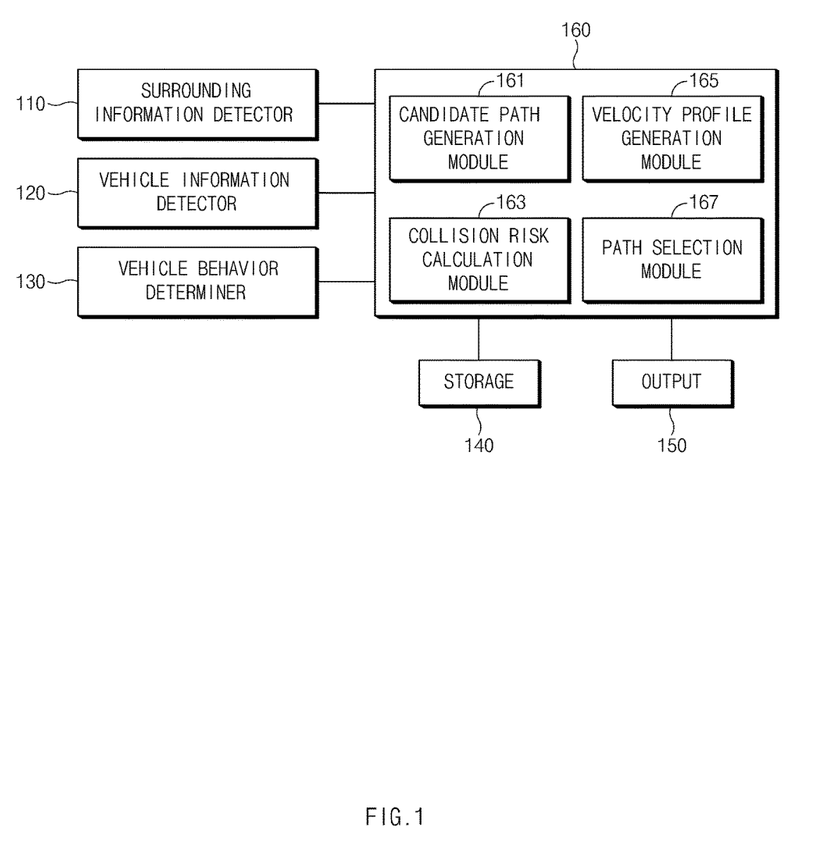
FIG. 1 illustrates a block diagram of a path planning apparatus for an autonomous vehicle, according to an exemplary embodiment of the present disclosure.
Figure 2:
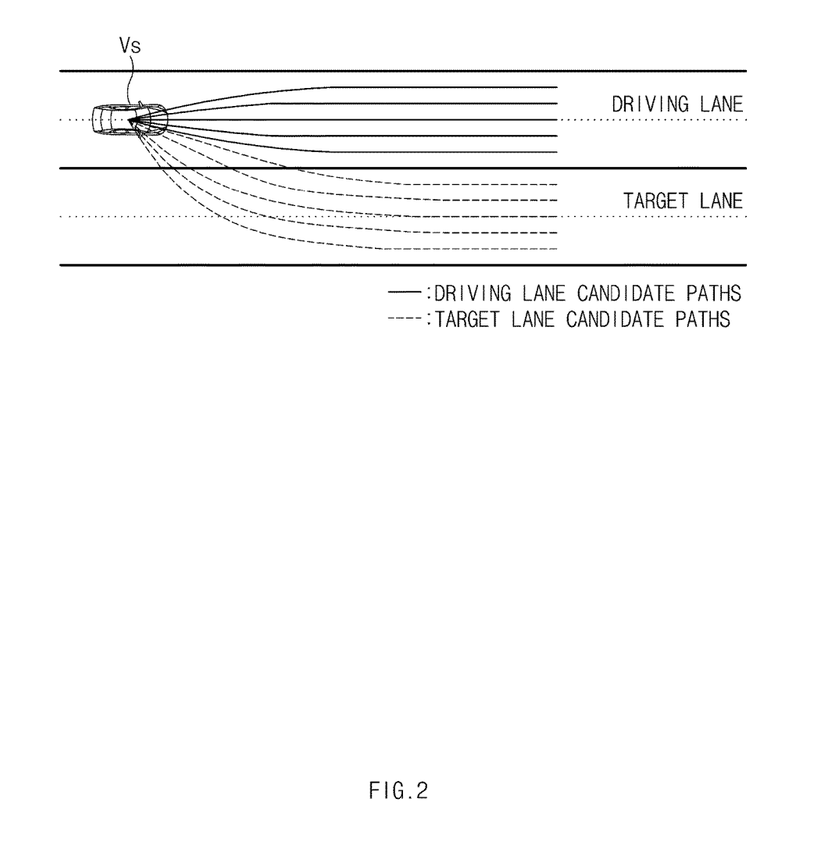
FIG. 2 illustrates an example of candidate path generation, according to an exemplary embodiment of the present disclosure.
Figure 3:
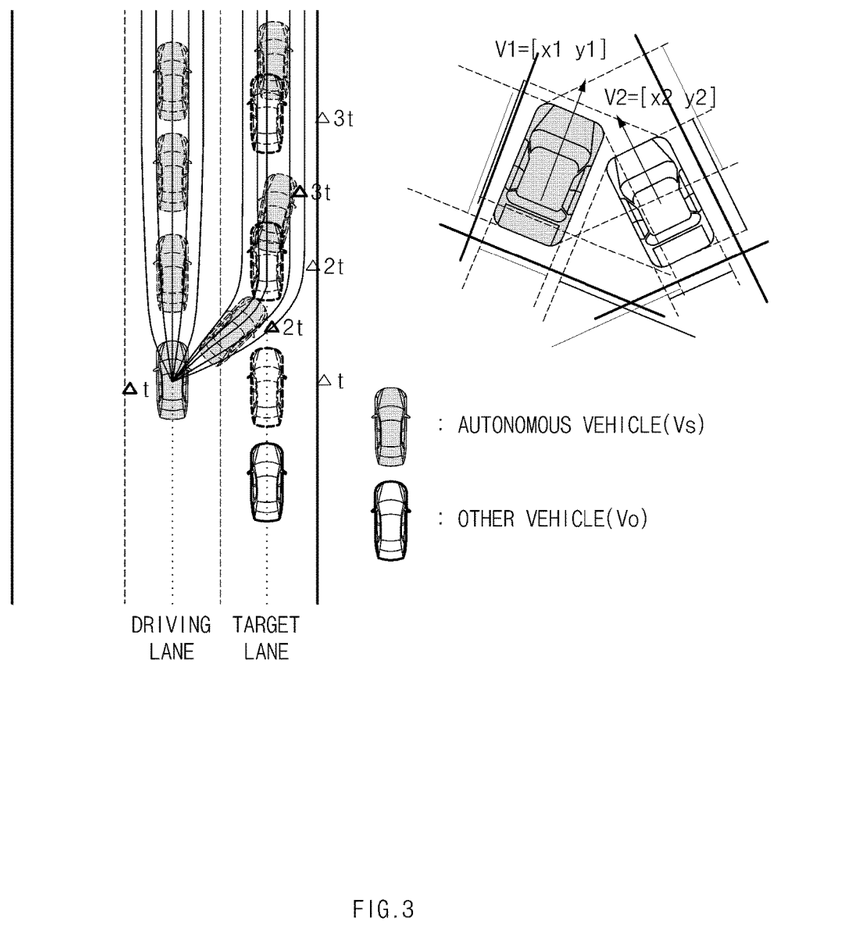
FIG. 3 illustrates a process of determining a collision with a neighboring vehicle, according to an exemplary embodiment of the present disclosure.
Figure 4:
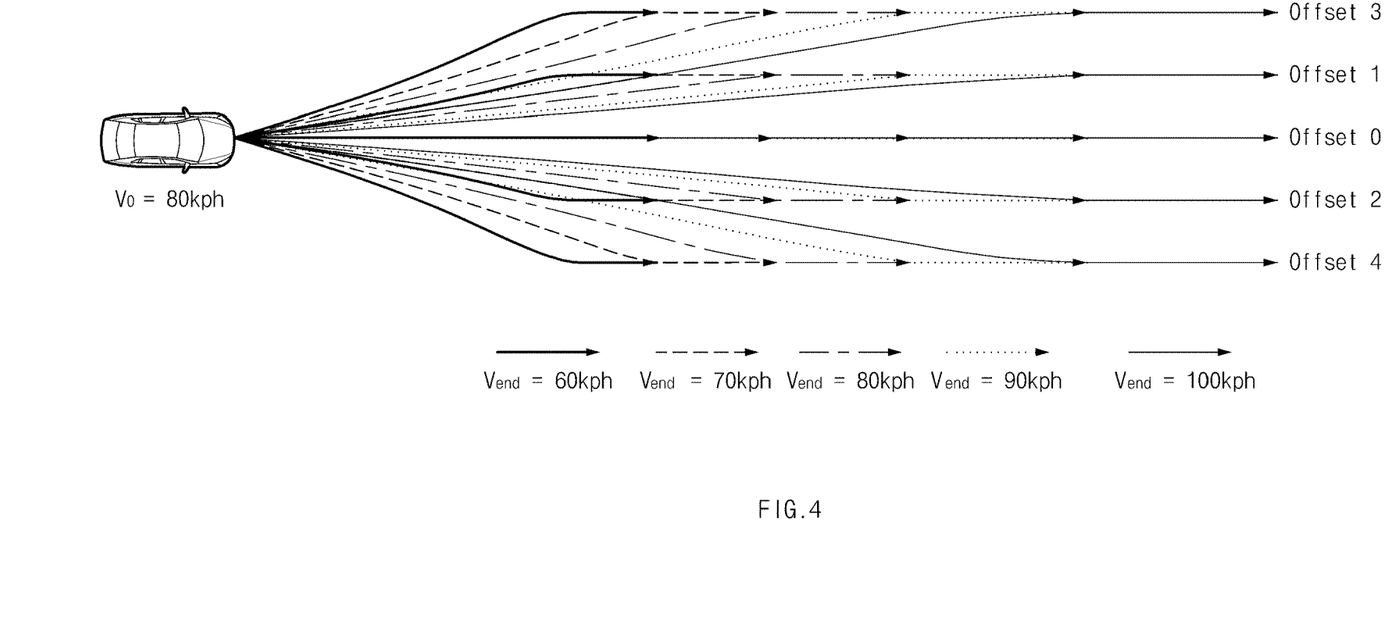
FIG. 4 illustrates candidate paths to which a velocity profile has been applied, according to an exemplary embodiment of the present disclosure.
Figure 5A:
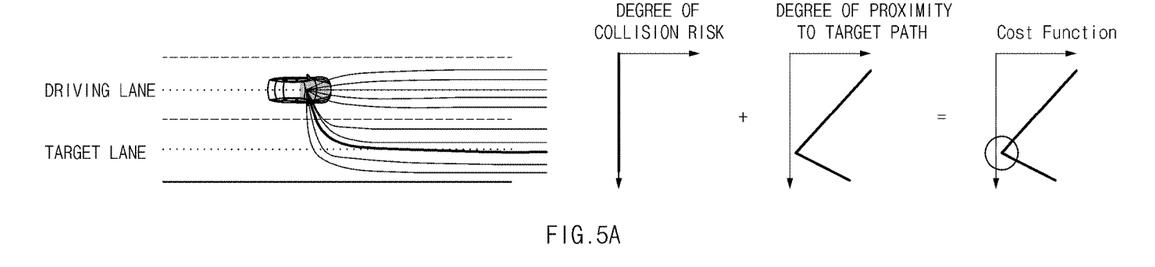
FIGS. 5A-5B illustrate a process of selecting a local reference path, according to an exemplary embodiment of the present disclosure.
Figure 5B:
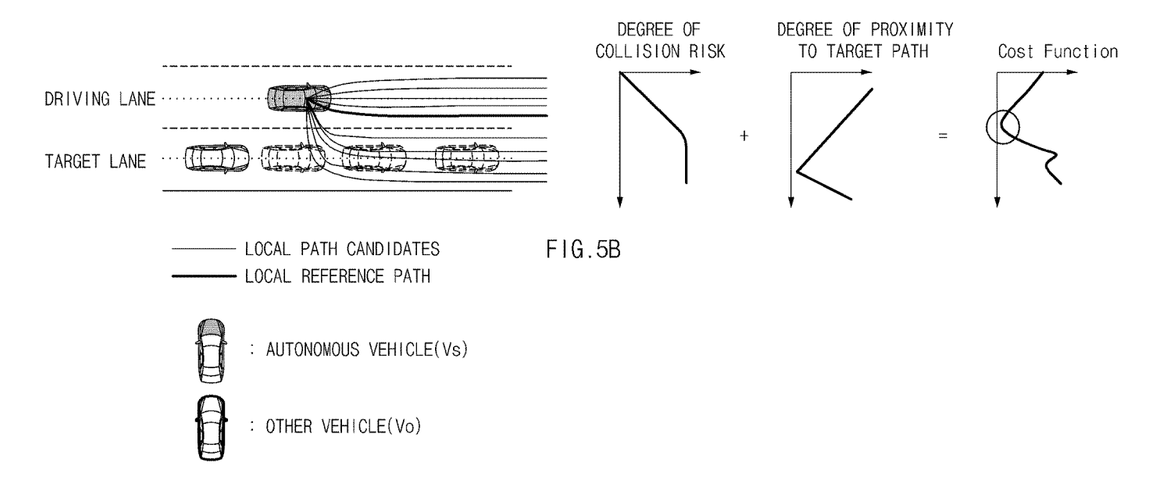

FIG. 1 illustrates a block diagram of a path planning apparatus for an autonomous vehicle, according to an exemplary embodiment of the present disclosure; FIG. 2 illustrates an example of candidate path generation, according to an exemplary embodiment of the present disclosure; FIG. 3 illustrates a process of determining a collision with a neighboring vehicle, according to an exemplary embodiment of the present disclosure; FIG. 4 illustrates candidate paths to which a velocity profile has been applied, according to an exemplary embodiment of the present disclosure; and FIGS. 5A-5B illustrate a process of selecting a local reference path, according to an exemplary embodiment of the present disclosure.

As illustrated in FIG. 1, the path planning apparatus for an autonomous vehicle may include a surrounding information detector 110, a vehicle information detector 120, a vehicle behavior determiner 130, a storage 140, an output 150, and a driving path generator 160 (e.g., a navigation system). The various detectors and components of the apparatus may be executed by a controller having a memory and a processor. In particular, the surrounding information detector 110 may be configured to detect surrounding information of a vehicle using various types of sensors mounted within the vehicle. The surrounding information may include road information, and the velocity, longitudinal acceleration, lateral acceleration, and position of a dynamic obstacle around the vehicle.

The surrounding information detector 110 may further be configured to obtain the surrounding information using an image sensor, a distance sensor, a position sensor, and the like. The distance sensor may be any one of an infrared sensor, a radio detection and ranging (RADAR) sensor, a light detection and ranging (LiDAR) sensor, a laser scanner, and the like, and the position sensor may be a global positioning system (GPS) receiver capable of obtaining position information of the vehicle. One or more image sensors, one or more distance sensors, and one or more position sensors may be mounted within the vehicle.

The vehicle information detector 120 may be configured to detect vehicle information regarding driving states of the vehicle using various types of sensors mounted within the vehicle. The vehicle information detector 120 may be configured to obtain the vehicle information such as the velocity, position, steering angle, and the like, of the vehicle using a velocity sensor, a position sensor, a steering angle sensor, and the like. The vehicle behavior determiner 130 may be configured to determine vehicle behavior based on a global path generated by a global path planner (not shown), the surrounding information, and the vehicle information. The vehicle behavior determiner 130 may be configured to determine whether the vehicle should make a lane change. The vehicle behavior determiner 130 may further be configured to determine a behavior mode of the vehicle based on whether the lane change is required. Particularly, the behavior mode may be divided into a lane keeping mode and a lane change mode.

For example, the vehicle behavior determiner 130 may be configured to determine whether the lane change is required when the vehicle makes a change to another expressway at a junction (JC) or enters an expressway at an interchange (IC). When the lane change is required, the vehicle behavior determiner 130 may be configured to determine a target lane for lane change, and transmit a lane change signal, together with information regarding the current driving lane and the target lane of the vehicle, to the driving path generator 160. Particularly, the vehicle behavior determiner 130 may be configured to notify the driving path generator 160 of the behavior mode of the vehicle. When a turn signal lamp is manipulated by a vehicle operator, the vehicle behavior determiner 130 may be configured to bypass a signal generated in relation to the operator's manipulation to the driving path generator 160.

The storage 140 may be configured to store road information, map information, a path generation program, a collision risk calculation program, a velocity profile generation program, input and/or output data of the driving path generator, and the like, for autonomous driving of the vehicle. In addition, the storage 140 may be configured to store a program for operating the path planning apparatus. The storage 140 may be provided as at least one of storage media such as a flash memory, a hard disk, a secure digital (SD) card, a random access memory (RAM), a read only memory (ROM), and a web storage.

The output 150 may interlock with a navigation system (not shown) to perform a mapping of the selected local reference path on map data and display the mapping results on a screen. The output 150 may be provided as at least one of an audio device, a display device, and a tactile device. The audio device may be configured output a warning sound, a guidance message, and the like, and may be provided as a speaker, a buzzer, and the like. The display device may be provided as at least one of a liquid crystal display (LCD), a thin film transistor-liquid crystal display (TFT LCD), an organic light emitting diode (OLED), a flexible display, a three-dimensional (3D) display, a transparent display, a head-up display (HUD), and a touchscreen. The tactile device may be configured to output tactile information that may be felt by the vehicle operator, using an oscillator, a cooling and/or heating device, and the like.

The driving path generator 160 may be configured to generate a local reference path (hereinafter referred to as the "local path") for tracking a global path predetermined by a global path planner (not shown). When the driving path generator 160 receives the lane change signal from the vehicle behavior determiner 130, the driving path generator 160 may be configured to generate a local path (a driving path) and a velocity profile for a lane change while the vehicle avoids a collision with a neighboring vehicle or a vehicle in close proximity to the subject vehicle (e.g., the vehicle being driven), using the surrounding information and the vehicle information.

When generating the driving path (the local path), the driving path generator 160 may be configured to generate different driving paths based on a maneuver mode of the vehicle. Particularly, the maneuver mode may be divided into a lane keeping mode and a lane change mode. For example, when the maneuver mode of the vehicle is the lane keeping mode, the driving path generator 160 may be configured to generate candidate paths within a current driving lane of the vehicle, and select any one of the candidate paths as a local path. Meanwhile, when the maneuver mode of the vehicle is the lane change mode, the driving path generator 160 may be configured to generate candidate paths with respect to a current driving lane of the vehicle and a target lane for lane change, respectively, and select the safest path among the candidate paths as a local path.

The driving path generator 160 may include a candidate path generation module 161, a collision risk calculation module 163, a velocity profile generation module 165, and a path selection module 167. When receiving the lane change signal from the vehicle behavior determiner 130, the driving path generator 160 may also be configured to receive the information regarding the current driving lane of the vehicle and the target lane for lane change.

Further, the candidate path generation module 161 may be configured to calculate a lane width and generate candidate paths allowing the autonomous vehicle not to be out of the corresponding lane. In particular, the candidate path generation module 161 may be configured to determine the number of candidate paths based on a lane width and a vehicle width, and offset intervals may differ accordingly. The candidate path generation module 161 may be configured to move both lane lines of the lane by a margin set based on the center of the lane, and then calculate a minimum distance between the lane lines as the lane width. The candidate path generation module 161 may be configured to generate the candidate paths with respect to the current driving lane of the vehicle and the target lane for lane change, respectively. Particularly, the candidate path generation module 161 may be configured to generate the predetermined number of candidate paths.

In addition, when the maneuver mode of the vehicle is the lane keeping mode, the candidate path generation module 161 may be configured to generate the candidate paths within the current driving lane of the vehicle, and when the maneuver mode of the vehicle is the lane change mode, the candidate path generation module 161 may be configured to generate the candidate paths with respect to the current driving lane and the target lane, respectively. The candidate paths with respect to the current driving lane, generated in the lane change mode, may be used to generate a path for avoiding a collision with a dynamic obstacle when the lane change has failed.

For example, the candidate path generation module 161 may be configured to generate candidate paths (e.g., driving lane candidate paths) within the driving lane, and candidate paths (e.g., target lane candidate paths) for moving from the driving lane to the target lane, as illustrated in FIG. 2. The collision risk calculation module 163 may be configured to calculate the degree of collision risk with respect to a dynamic obstacle (e.g., a neighboring vehicle) using the surrounding information, the road information, and the vehicle information output from the surrounding information detector 110 and the vehicle information detector 120. In particular, the collision risk calculation module 163 may be configured to calculate the degree of collision risk with respect to the dynamic obstacle for each of the target lane candidate paths. When the degree of collision risk is greater than or equal to a threshold value, the collision risk calculation module 163 may be configured to determine that there is a collision risk.

The collision risk calculation module 163 may be configured to predict a driving path of the dynamic obstacle using the information regarding the velocity, longitudinal acceleration, lateral acceleration, and position of the dynamic obstacle and the road information that have been obtained by the surrounding information detector 110. When the driving path of the dynamic obstacle is predicted, the collision risk calculation module 163 may be configured to predict the positions of the vehicle and the dynamic obstacle pert seconds to determine whether there is a collision risk (see FIG. 3). As a time to collision (TTC) is reduced, the degree of collision risk may be increased.

Furthermore, velocity profile generation module 165 may be configured to generate the velocity profile of the vehicle using a vehicle velocity, a set target velocity, and the road information. In addition, the velocity profile generation module 165 may be configured to apply the velocity profile to the generated target lane candidate paths, as illustrated in FIG. 4. The target velocity refers to a vehicle velocity when the lane change is completed, and a regulated velocity on a corresponding road may be set as a default value. The velocity profile may be used to find a velocity allowing the vehicle to make the lane change without the collision with the dynamic obstacle by reducing or increasing the vehicle velocity.

When there is a collision risk with the dynamic obstacle in all of the target lane candidate paths even while the velocity changes, the velocity profile generation module 165 may be configured to search the dynamic obstacle around the vehicle (e.g., the subject vehicle) and measure the velocity of the dynamic obstacle that prevents the lane change. In addition, the velocity profile generation module 165 may be configured to set a velocity reduced by TBD % (to be determined) with respect to the measured velocity of the dynamic obstacle as the target velocity. In particular, TBD % is a velocity control rate, which is a predetermined tuning value. In other words, when the lane change has failed, the velocity profile generation module 165 may be configured to adjust the velocity of the dynamic obstacle that prevents the lane change with the velocity control rate (TBD %) to adjust the target velocity (=the velocity of the dynamic obstacle×TBD %).

Therefore, while the vehicle is travelling at a velocity less than that of a neighboring vehicle that prevents the lane change, the vehicle may attempt a lane change again when a space is available for a lane change. The path selection module 167 may be configured to select a local path from among the candidate paths based on the degree of collision risk and the degree of proximity to a target path. In particular, the path selection module 167 may be configured to select, as the local path, a candidate path having a minimum cost MIN(λ) among the candidate paths using a cost function expressed by the following equation 1:

$$\lambda = \alpha \times D_{tolRP} + \beta \times \rho_{max} \qquad \text{Equation 1}$$

wherein, $\alpha$ and $\beta$ indicate weights according to parameters; $D_{tolRP}$ indicates a distance from the center of the vehicle to the local path, which is the degree of proximity to the target path; and $\rho_{max}$ indicates the degree of collision risk with respect to the dynamic obstacle.

As illustrated in FIG. 5A, when there is no collision risk with the neighboring vehicle, a path guiding the vehicle to the center of the target lane among the candidate paths with respect to the target lane may be selected as the target path, and a candidate path having a smallest degree of proximity to the target path may be selected as the local path. As illustrated in FIG. 5B, when the lane change has failed due to the collision risk with the neighboring vehicle, the path selection module 167 may be configured to select a path that is closest to the target lane from among the candidate paths generated within the current driving lane. The driving path generator 160 may be configured to output the selected driving path to a driving control apparatus (not shown). The driving control apparatus may be configured to operate a power plant device, a power transmission device, a driving device, a steering system, a brake device, a suspension system, a speed change device, and the like, to control the vehicle to travel along the selected local path.

Figure 6:
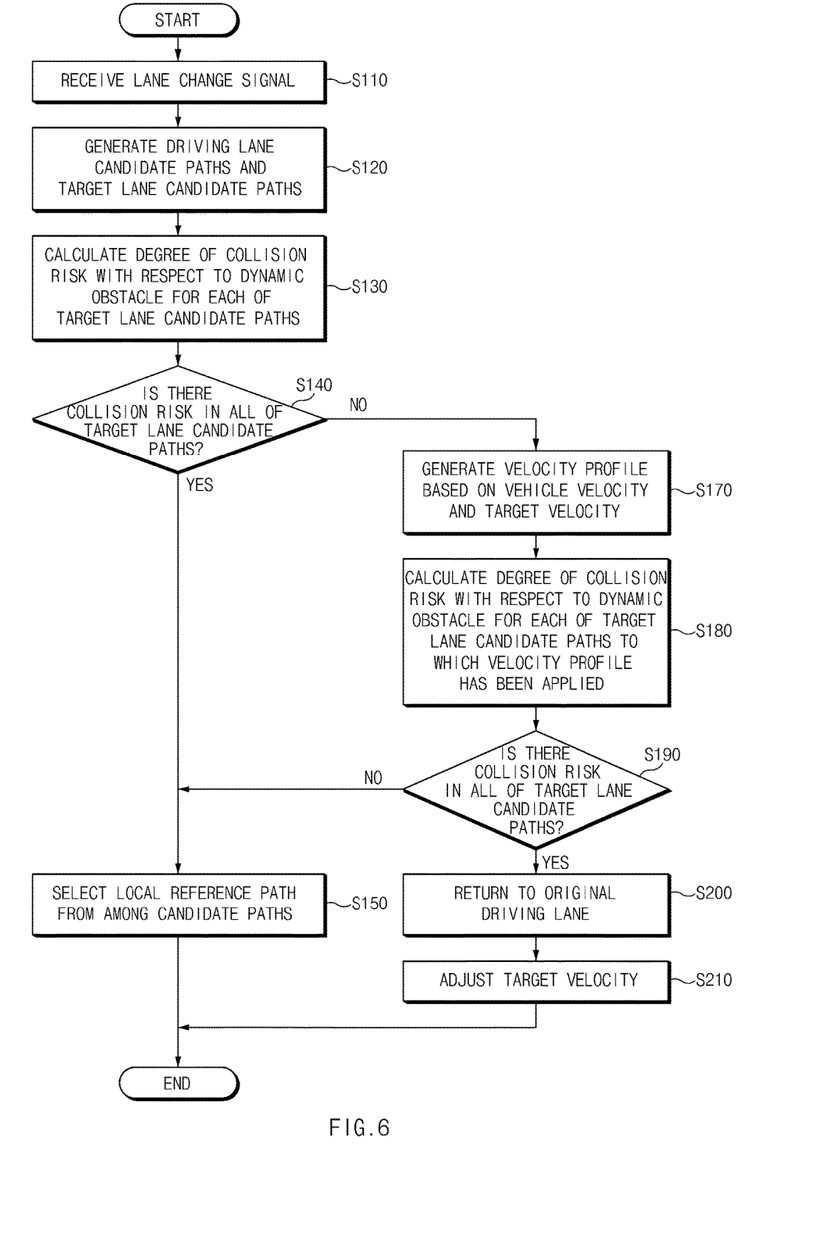
FIG. 6 illustrates a flowchart of a path planning method for an autonomous vehicle, according to an exemplary embodiment of the present disclosure.

FIG. 6 illustrates a flowchart of a path planning method for an autonomous vehicle, according to an exemplary embodiment of the present disclosure. The driving path generator 160 may be configured to receive a lane change signal from the vehicle behavior determiner 130 in operation S110. Particularly, when transmitting the lane change signal, the vehicle behavior determiner 130 may be configured to also provide information regarding a current driving lane and a target lane for lane change to the driving path generator 160. For example, when the vehicle travelling on a first expressway changes from the first expressway to a second expressway at an adjacent junction (JC), the vehicle behavior determiner 130 may be configured to check the current driving lane of the vehicle and determine whether a lane change is required to enter the junction. In addition, when the lane change is required, the vehicle behavior determiner 130 may be configured to transmit the lane change signal and the information regarding the current driving lane and the target lane to the driving path generator 160.

When the driving path generator 160 receives the lane change signal, the driving path generator 160 may be configured to generate candidate paths with respect to the driving lane and the target lane in operation S120. The candidate path generation module 161 of the driving path generator 160 may be configured to generate candidate paths (hereinafter referred to as "driving lane candidate paths") within the driving lane in which the vehicle is currently positioned. In addition, the candidate path generation module 161 may be configured to generate candidate paths (hereinafter referral to as "target lane candidate paths") for the lane change from the driving lane to the target lane. Particularly, the driving lane candidate paths may be used for the vehicle returning to an original driving lane when the lane change has failed.

The driving path generator 160 may be configured to calculate the degree of collision risk with respect to a dynamic obstacle (e.g., a neighboring vehicle) during the lane change in operation S130. The collision risk calculation module 163 of the driving path generator 160 may be configured to calculate the degree of collision risk with the dynamic obstacle for each of the target lane candidate paths. The driving path generator 160 may then be configured to determine whether there is a collision risk in all of the target lane candidate paths based on the calculated degree of collision risk in operation S140. Particularly, the collision risk calculation module 163 may be configured to determine the collision risk when the degree of collision risk is greater than or equal to a threshold value.

When there is no collision risk in all of the target lane candidate paths, the driving path generator 160 may be configured to select any one of the target lane candidate paths as a local path in operation S150. In other words, when a collision is not predicted in one or more candidate paths among the target lane candidate paths, the path selection module 167 of the driving path generator 160 may be configured to select one of the corresponding candidate paths in which the collision is not predicted as the local path. In particular, the path selection module 167 may be configured to select a candidate path having a lowest degree of collision risk among the target lane candidate paths as the local path.

Meanwhile, when the collision is predicted in all of the target lane candidate paths in operation S140, the driving path generator 160 may be configured to generate a velocity profile based on a vehicle velocity and a target velocity in operation S170. The velocity profile generation module 165 of the driving path generator 160 may be configured to apply the velocity profile generated based on the current driving velocity and the set target velocity to the target lane candidate paths. The target velocity may be set as a regulated velocity on a corresponding road.

Furthermore, the driving path generator 160 may be configured to calculate the degree of collision risk with the dynamic obstacle for each of the target lane candidate paths to which the velocity profile has been applied in operation S180. The collision risk calculation module 163 may then be configured to calculate the degree of collision risk with the dynamic obstacle in the target lane candidate paths in consideration of the velocity profile. The driving path generator 160 may be configured to determine whether there is a collision risk in all of the target lane candidate paths based on the degree of collision risk for each of the target lane candidate paths to which the velocity profile has been applied in operation S190. When there is no collision risk in one or more candidate paths among the target lane candidate paths, the path selection module 167 of the driving path generator 160 may be configured to select any one of the corresponding candidate paths as the local path in operation S150.

When the collision risk is detected in all of the target lane candidate paths, the driving path generator 160 may be configured to allow the vehicle to return to the original driving lane in operation S200. That is, the path selection module 167 may be configured to select a candidate path closest to the target lane among the target lane candidate paths as the local path. The driving path generator 160 may then be configured to calculate the velocity of the dynamic obstacle preventing the lane change of the vehicle to adjust a target velocity in operation S210. In particular, the velocity profile generation module 165 of the driving path generator 160 may be configured to adjust the velocity of the neighboring vehicle preventing the lane change with a predetermined velocity control rate (TBD %) to set the target velocity.

In the above-described exemplary embodiments of the present disclosure, all of the elements are combined to operate as a single system, but the present inventive concept is not limited thereto. In order words, some of the elements may be selectively combined to operate within the scope of the present inventive concept. In addition, all of the elements may be provided as independent hardware units, or part or all of the elements may be selectively combined to configure a computer program having program modules performing part or all of functions in a single or a plurality of hardware units. Codes and code segments constituting the computer program may easily be inferred by a person skilled in the art. In addition, the computer program may be stored in a computer-readable medium and be read and executed by a computer, thereby implementing the method according to the exemplary embodiment of the present disclosure.

As set forth above, the autonomous vehicle may execute a lane change more stably by determining the degree of collision risk with respect to the dynamic obstacle around the vehicle to generate a safe driving path and generating a velocity profile that allows the vehicle to execute the lane change without the collision with the dynamic obstacle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A path planning apparatus for an autonomous vehicle, comprising:
   a surrounding information detector configured to detect surrounding information around the vehicle;
   a vehicle information detector configured to detect vehicle information regarding driving states of the vehicle;
   a determiner configured to determine a lane keeping and a lane changing of the vehicle based on the surrounding information and the vehicle information; and
   a driving path generator configured to generate a driving path and a velocity profile for a lane change using the surrounding information and the vehicle information when receiving a lane change signal from the determiner,
   wherein the surrounding information includes road information regarding the vehicle, and the velocity, longitudinal acceleration, lateral acceleration, and position of a dynamic obstacle around the vehicle, and
   wherein the driving path generator generates candidate paths within a current driving lane of the vehicle when a maneuver mode of the vehicle is a lane keeping mode, and the driving path generator generates candidate paths with respect to the current driving lane of the vehicle and a target lane for lane change respectively when the maneuver mode of the vehicle is a lane change mode, the candidate paths with respect to the current driving lane of the vehicle are used for the vehicle returning to an original driving lane when the lane change has failed, and
   wherein the driving path generator includes a path selection module, the path selection module selects, as a local reference path, a candidate path that is closest to a target lane among the driving lane candidate paths, when the lane change has failed.

2. The path planning apparatus according to claim 1, wherein the surrounding information detector is configured to detect the surrounding information using an imaging device, a distance sensor, and a position sensor.

3. The path planning apparatus according to claim 1, wherein the vehicle information detector is configured to detect the velocity and position of the vehicle using a velocity sensor and a position sensor.

4. The path planning apparatus according to claim 1, wherein the determiner is configured to bypass a signal generated in relation to a vehicle operator's manipulation to the driving path generator when a turn signal lamp is manipulated.

5. The path planning apparatus according to claim 1, wherein the driving path generator include:
  a candidate path generation module configured to generate driving lane candidate paths and target lane candidate paths;
  a collision risk calculation module configured to calculate the degree of collision risk with respect to a dynamic obstacle positioned around the vehicle for each of the target lane candidate paths;
  a velocity profile generation module configured to generate the velocity profile using the road information and the vehicle information; and
  a path selection module configured to select the local reference path from among the target lane candidate paths based on the degree of collision risk or both the degree of collision risk and the velocity profile.

6. The path planning apparatus according to claim 5, wherein the path selection module is configured to select, as the local reference path, a candidate path having a lowest degree of collision risk among the target lane candidate paths.

7. The path planning apparatus according to claim 5, wherein the path selection module is configured to select, as the local reference path, a candidate path having a minimum cost through a cost function to which the degree of collision risk and the degree of proximity to a target path have been applied.

8. A path planning method for an autonomous vehicle, comprising:
  receiving, by a controller, a lane change signal from a determiner;
  generating, by the controller, driving lane candidate paths and target lane candidate paths based on the surrounding information and the vehicle information when the lane change signal is received, wherein the surrounding information includes road information regarding the vehicle, and the velocity, longitudinal acceleration, lateral acceleration, and position of a dynamic obstacle around the vehicle;
  calculating, by the controller, the degree of collision risk with respect to the dynamic obstacle positioned around the vehicle for each of the target lane candidate paths;
  determining, by the controller, whether there is a collision risk in all of the target lane candidate paths based on the calculated degree of collision risk;
  generating, by the controller, a velocity profile of the vehicle based on the vehicle velocity and a target velocity when there is the collision risk in all of the target lane candidate paths; and selecting, by the controller, a local reference path from among the target lane candidate paths to which the velocity profile has been applied,
  wherein the driving lane candidate paths are generated within a current driving lane of the vehicle when a maneuver mode of the vehicle is a lane keeping mode, and the driving land candidate paths and the target lane candidate path are generated with respect to the current driving lane of the vehicle and the target lane for lane change respectively when the maneuver mode of the vehicle is a lane change mode, the driving lane candidate paths are used for the vehicle returning to an original driving lane when the lane change has failed, and
  wherein the local reference path is selected as a candidate path that is closest to a target lane among the driving lane candidate paths, when the lane change has failed.

9. The path planning method according to claim 8, wherein the selecting of the local reference path includes:
  calculating, by the controller, the degree of collision risk with respect to the dynamic obstacle for each of the target lane candidate paths to which the velocity profile has been applied;
  determining, by the controller, whether there is the collision risk in all of the target lane candidate paths to which the velocity profile has been applied; and
  selecting, by the controller, as the local reference path, a candidate path having a lowest degree of collision risk among the target lane candidate paths to which the velocity profile has been applied, when there is no collision risk in one or more candidate paths among the target lane candidate paths to which the velocity profile has been applied.

10. The path planning method according to claim 9, further comprising:
  returning, by the controller, the vehicle to the original driving lane when there is the collision risk in all of the target lane candidate paths to which the velocity profile has been applied, in the determining whether there is a collision risk in all of the target lane candidate paths to which the velocity profile has been applied.

11. The path planning method according to claim 10, further comprising:
  setting, by the controller, the target velocity by estimating a velocity of the dynamic obstacle preventing the lane change of the vehicle and adjusting the estimated velocity of the dynamic obstacle with a predetermined velocity control rate, after returning to the original driving lane.

12. The path planning method according to claim 8, further comprising:
  selecting, by the controller, any one of the target lane candidate paths as the local reference path in consideration of the degree of collision risk with the dynamic obstacle and the degree of proximity to a target path when there is no collision risk in all of the target lane candidate paths, after calculating the degree of collision risk with respect to the dynamic obstacle.

* * * * *